United States Patent [19]

Udipi et al.

[11] Patent Number: 4,987,187
[45] Date of Patent: Jan. 22, 1991

[54] POLYBLENDS OF THERMOPLASTIC COPOLYESTERS AND STYRENE ACRYLONITRILE COPOLYMERS

[75] Inventors: Kishore Udipi, Longmeadow; Allen R. Padwa, Worcester, both of Mass.

[73] Assignee: Monsanto Company, St. Louis, Mo.

[21] Appl. No.: 453,851

[22] Filed: Dec. 20, 1989

[51] Int. Cl.$^5$ .............................................. C08L 67/02
[52] U.S. Cl. ...................................... 525/173; 525/175
[58] Field of Search ................................ 525/173, 175

[56] References Cited

U.S. PATENT DOCUMENTS

| | | |
|---|---|---|
| 3,564,077 | 2/1971 | Brinkmann et al. . |
| 3,578,730 | 5/1971 | Herwig et al. . |
| 4,080,354 | 3/1978 | Kramer . |
| 4,148,956 | 4/1979 | Breitenfeller et al. . |
| 4,327,012 | 4/1982 | Salee . |
| 4,397,986 | 8/1983 | Hornbaker . |

FOREIGN PATENT DOCUMENTS 0269027  6/1988  European Pat. Off. .

*Primary Examiner*—Patricia Short

[57] ABSTRACT

A molding composition prepared from a blend of: (A) a copolyester of a dicarboxylic acid moiety, such as terephthalic acid or dimethyl terephthalate and a dihydric alcohol moiety, such as ethylene glycol in combination with diethylene glycol or 1,4-cyclohexanedimethanol, and (B) a copolymer prepared from a styrenic monomer and an ethylenically unsaturated nitrile, wherein articles molded from such compositions have improved clarity and toughness.

12 Claims, No Drawings

POLYBLENDS OF THERMOPLASTIC COPOLYESTERS AND STYRENE ACRYLONITRILE COPOLYMERS

BACKGROUND OF THE INVENTION

This invention relates to thermoplastic molding compositions comprised of thermoplastic copolyesters and styrenic copolymers. More specifically, it relates to the blending of a copolyester with a styrene acrylonitrile copolymer resulting in a product with good toughness and good clarity.

Thermoplastic polyesters, for example, polyethylene terephthalate (PET) and polybutylene terephthalate (PBT) are molding compositions from which articles with valuable mechanical properties can be produced. However, they have high deformation tendencies at elevated temperatures, low heat distortion temperatures (HDT), and moderate impact strength and toughness. When modifying agents consisting of polymers or copolymers including, for example, an acrylonitrile-acrylate-styrenic copolymer, is added, the resulting product displays better dimensional stability, increased HDT's, good impact strength and toughness.

Yet for applications such as refrigerator crisper pans, covers for personal-computer (PC) printers and the like, additional toughness is required along with increased clarity.

Accordingly, it is a primary object of the present invention to provide a unique blend of copolyester and styrene acrylonitrile copolymer (SAN) that produces a product exhibiting toughness and clarity.

DESCRIPTION OF THE PRIOR ART

PETG, the copolyester used in the present invention, is well known in the art and is described in U.S. Pat. No. 4,381,356. It is a copolyester of a dicarboxylic acid moiety, at least 50 mole percent of which is terephthalic acid or dimethyl terephthalate, and a dihydric alcohol moiety, at least 50 mole percent of which is ethylene glycol and 20 to 50 mole percent of which is diethylene glycol or 1,4-cyclohexanedimethanol, the copolyester having a glass transition temperature (Tg) in the range of 40° to 85° C and an inherent viscosity (I.V.) in the range of 0.2 to 10. The viscosity is determined at 25° C. using 0.5 grams of polymer per 100 ml. of a solvent composed of 60% phenol and 40% tetrachloroethane.

SAN, similarly, is well known in the art and is described in U.S. Pat. No. 4,824,907 as a copolymer of a styrenic monomer that can be styrene itself or various derivatives of styrene in which either or both of the benzene ring and the vinyl group can be substituted, as by, for example, an alkyl group or a halogen atom, and an ethylenically unsaturated nitrile monomer including acrylonitrile, methacrylonitrile and ethacrylonitrile. The copolymer will usually be comprised of 65 to 90% by weight of the styrenic monomer and 35 to 10% by weight of the nitrile monomer.

PETG has been blended with a variety of polymers including styrene-butadiene rubber (U.S. Pat. No. 3,564,077); polymethylbutene (U.S. Pat. No. 3,578,730); a modified styrene/acrylonitrile copolymer (U.S. Pat. No. 4,148,956); poly(styrene/acrylate) and poly(styrene/acrylonitrile/acrylate) (U.S. Pat. No. 4,397,986).

SAN has been combined with several copolyesters including polybutylene terephthalate (U.S. Pat. No. 4,080,354) and a copolyester prepared from a bisphenol and a dicarboxylic acid (U.S. Pat. No. 4,327,012).

SUMMARY OF THE INVENTION

The present invention is directed to a polyblend comprising:
1. 95 to 65% by weight of a copolyester of a dicarboxylic acid moiety, at least 50 mole percent of which is terephthalic acid, and a dihydric alcohol moiety, at least 50 mole percent of which is ethylene glycol and 20 to 50 mole percent of which is diethylene glycol or 1,4-cyclohexanedimethanol, and
2. 5 to 35% by weight of a copolymer prepared from a styrenic monomer and an ethylenically unsaturated nitrile, wherein the total amount of (1) and (2) is 100% by weight.

DESCRIPTION OF THE PREFERRED EMBODIMENTS

These polyblends are useful in a wide variety of applications including crisper pans for refrigerators, covers for PC printers, and various medical applications which require toughness and clarity.

The inventive composition generally will have a preferred Inverted Dart Impact (IDI) of greater than 17.0 Joules (J) and more preferably greater than 55.0 J. In addition, the inventive composition generally will have a minimum % light transmittance measurement of greater than 80.00, and a Minimum Molding Pressure (MMP) of less than 8.0 megapascals (MPa) and preferably less than 6.7 MPa.

In general, the molding composition contains 95 to 65% by weight of the copolyester, PETG, and 5 to 35% by weight of the SAN copolymer based on the total weight of PETG and SAN.

The PETG used is a copolyester of a dicarboxylic acid moiety, at least 50 mole percent of which is terephthalic acid, and a dihydric alcohol moiety, at least 50 mole percent of which is ethylene glycol and 20 to 50 mole percent of which is diethylene glycol or 1,4-cyclohexanedimethanol. The PETG has a glass transition temperature (Tg) in the range of 40° to 85° C. and an inherent viscosity (I.V.) in the range of 0.2 to 10. The viscosity is determined at 25° C. using 0.5 grams of polymer per 100 ml of a solvent composed of 60% phenol and 40% tetrachloroethane. The preferred PETG is purchased from Eastman Chemical Products, Inc. under the product name Kodar PETG Copolyester 6763 or Ektar GN 001.

The preferred SAN contains 65 to 90% by weight of styrene and 35 to 10% by weight of acrylonitrile and has a number average molecular weight of at least 5000. Other known derivatives of styrene, such as alpha-methylstyrene, may be used to replace the styrene monomer and other ethylenically unsaturated nitriles, such as methacrylonitrile and ethacrylonitrile, may be used to replace the acrylonitrile monomer provided that the requirements of processability, toughness and clarity are met in the final blend. Mixtures of styrenic monomers and mixtures of ethylenically unsaturated nitriles can also be employed if desired provided again that the desired toughness, clarity and processability is obtained in the final blend. The preferred SAN is available from Monsanto Company under the product name Lustran ® SAN 31.

In addition to the above components, the polyblends of the invention can advantageously contain other additives such as plasticizers, lubricants, antioxidants, stabilizers, flame-retardants, fibers, mineral fibers, dyes, pigments and the like. However, some such additives may have an adverse effect on clarity and toughness.

The preparation of the inventive molding composition was performed utilizing two separate methods: (1) the Salt-and-Pepper Blend method where the PETG and SAN in the form of pellets are blended and conveyed to the molding machine; and (2) the Compounding method where the PETG and SAN in the form of pellets are blended, then compounded in a Leistritz twin-screw-extruder and then conveyed to the molding machine where test specimens are produced.

The preferred method, as revealed in Table II, is the Salt-and-Pepper Blend method where a product with equivalent mechanical properties and better clarity as compared to pre-compounded samples is obtained.

In the working examples set forth below the following components are used:

PETG—a copolyester of a dicarboxylic acid moiety, at least 50 mole percent of which is terephthalic acid, and a dihydric alcohol moiety, at least 50 mole percent of which is ethylene glycol and 20 to 50 mole percent of which is 1,4-cyclohexanedimethanol and purchased from Eastman Chemical Products, Inc. under the product name Kodar PETG Copolyester 6763 or Ektar GN 001.

SAN—a copolymer of 78% by weight based on the weight of the copolymer of styrene and 22% by weight based on the weight of the copolymer of acrylonitrile sold by Monsanto Company under the name Lustran ® SAN 31.

SAMPLE PREPARATION

1. Salt-and-Pepper Blend Method

In this method the PETG and SAN pellets were simply pellet-mixed and then vacuum dried overnight at 68° C. The dried blends were then molded in an Engel Molding Machine (model no. ES80) using the following molding conditions:

| Mold Temperature | 20 to 24° C. |
|---|---|
| Zone Temperatures | 1 (nozzle) 2 3 4 |
| | 243° 243° 243° 238° C. |
| Screw Speed | 100 rpm |
| Back Pressure | 1.38 MPa |
| Post Pressure | Minimum Molding Pressure, MPa |
| Injection Pressure | Minimum Molding Pressure + 2.07 MPa |
| Injection Speed | 5.0 to 10 cm/sec (varied to adjust injection time to the target) |
| Injection Time | 1.5 sec. |

The freshly molded specimens were sealed in a foil bag to prevent moisture absorption prior to testing.

2. Compounding Method

In this method the Salt-and-Pepper Blends were further processed by compounding in a Leistritz twin-screw-extruder with vacuum venting under the following conditions:

| Temperature (zone 1-10) | 260° C. |
|---|---|
| Screw Speed | 250 rpm |
| In- and Out-put rate | 13.6 to 15.9 kg/hr (range) |

| -continued | |
|---|---|
| Amperage | 21 to 24 amps. |

The extruded materials were pelletized and then vacuum dried overnight at 68° C. The dried pellets were molded in an Engel Molding Machine (model no. ES80) under the following conditions:

| Mold Temperature | 20 to 24° C. |
|---|---|
| Zone Temperatures | 1 (nozzle) 2 3 4 |
| | 243° 243° 243° 238° C. |
| Screw Speed | 100 rpm |
| Back Pressure | 1.38 MPa |
| Post Pressure | Minimum Molding Pressure, MPa |
| Injection Pressure | Minimum Molding Pressure + 2.07 MPa |
| Injection Speed | 5.0 to 10 cm/sec (varied to adjust injection time to the target) |
| Injection Time | 1.5 sec. |

The freshly molded specimens were sealed in a foil bag to prevent moisture absorption prior to testing.

TEST METHODS

The molded specimens were subjected to the following tests:

Minimum Molding Pressure (MMP)

The MMP is the hydraulic pressure required to fill about 90% of the molding cavity of an Engel Molding Machine (model no. ES80) per unit time under the conditions set forth in the section "Sample Preparation". The injection pressure is the MMP plus 2.07 MPa to completely fill the mold.

Multiaxial Inverted Dart Impact (IDI)

The IDI determination utilized represents a modification of the test as described in Society of Plastics Engineers National Technical Conference "Plastics in Surface Transportation" Nov. 12–14, 1974, Detroit, Mich., at page 238. In the modified test, instead of the dart being attached to the slider and striking the sample, the sample holder is attached to the slider and strikes the instrumented dart. The rotary potentiometer is not used. The instrumented dart used is 1.27 cm in diameter, and the sample strikes the instrumented dart at a velocity of 140.2 m/min. The samples are injection molded into 7.62 cm × 10.16 cm × 0.254 cm and then are cut into 3.81 cm × 5.08 cm × 0.254 cm pieces for testing. Results are given in Joules (J).

Transparency (Total Transmittance, %)

Total transmittance, the amount of radiant energy transmitted by the sample under analysis, was measured by a Hunter Ultra Scan Spectrometer using the illuminant A (indoor light).

Contrast Ratio (CR)

Clarity is defined in terms of the image degradation of standard printed scales viewed through the molded specimen. The contrast ratio, reflectance (with white background)/reflectance (with black background), is believed to be more representative of a materials clarity. The lower CR means better clarity.

$$CR = \frac{\text{Reflectance (with white background)}}{\text{Reflectance (with black background)}}$$

An ACS Spectra Sensor Model 2 (Single Beam) Spectrometer was used to measure reflectance.

EXAMPLES 1 TO 11

In these examples molded specimens prepared by the Salt-and-Pepper Blend method and containing various amounts of PETG and SAN are tested for processability as determined by the Minimum Molding Pressure (MMP), toughness as determined by the IDI test and clarity as determined by % light transmittance. The results are tabulated in Table I.

TABLE I

| | SUMMARY OF EXAMPLES 1 TO 11 | | | | |
|---|---|---|---|---|---|
| Example | % PETG | % SAN | MMP, MPa | IDI, JOULES | TRANSMITTANCE, % |
| 1 PET-G (Control) | 100 | 0 | 7.2 | 89.3 | 86.26 |
| 2 | 95 | 5 | 7.9 | 88.9 | 84.24 |
| 3 | 90 | 10 | 6.6 | 89.5 | 84.58 |
| 4 | 80 | 20 | 6.3 | 92.4 | 85.17 |
| 5 | 75 | 25 | 6.1 | 72.4 | 83.30 |
| 6 | 70 | 30 | 5.9 | 59.4 | 85.77 |
| 7 | 65 | 35 | 6.0 | 18.2 | 84.74 |
| 8 | 60 | 40 | 5.6 | 1.1 | 86.58 |
| 9 | 40 | 60 | 5.0 | 1.1 | 87.22 |
| 10 | 20 | 80 | 4.7 | 0.7 | 87.15 |
| 11 SAN (Control) | 0 | 100 | 4.5 | 1.2 | 90.30 |

A review of the MMP, IDI, and % Transmittance values in Table I indicates that compositions containing 95 to 65% by weight of PETG exhibit the desired balance of processability, toughness and clarity. There is a sharp drop in toughness when the level of PETG goes from 65 to 60% by weight.

Table I shows the MMP increasing with the increasing of % PETG and that the IDI of PETG/SAN 80/20 is higher or equal to the straight PETG. The IDI of PETG/SAN 60/40 drops to a very low value possibly due to the SAN phase dominating at this composition resulting in brittle materials. Table I shows the transmittance generally decreasing with increasing % PETG to a minimum at 75%.

EXAMPLES 12 TO 15

In Examples 12 to 15 PETG/SAN polymer blend systems at two different compositions are prepared utilizing the Salt-and-Pepper Blend method and the Compounding method. The data obtained from these four samples is listed in Table II.

TABLE II

| | SUMMARY OF EXAMPLES 12 TO 15 | | | | | | |
|---|---|---|---|---|---|---|---|
| Example | % PETG | % SAN | MIXING | MMP, MPa | IDI, JOULES | TRANSMITTANCE, % | CONTRAST RATIO (CR) |
| 12 | 70 | 30 | Compounding | 6.4 | 98.0 | 82.08 | 16.23 |
| 13 | 70 | 30 | Salt-and-Pepper Blend | 6.4 | 83.1 | 86.14 | 15.69 |
| 14 | 80 | 20 | Compounding | 6.3 | 95.9 | 84.77 | 15.99 |
| 15 | 80 | 20 | Salt-and-Pepper Blend | 6.9 | 97.6 | 85.26 | 15.74 |

A review of the data in Table II indicates that at the 80% level of PETG the specimens prepared by the Salt-and-Pepper Blend method have a higher MMP. However, at 80% PETG there is relatively no difference of IDI's between specimens prepared by the Salt-and-Pepper Blend method and Compounded materials. At 70% PETG the IDI of compounded PETG/SAN is about 14.7 Joules higher than that of the Salt-and-Pepper Blend formulation.

In each pair of examples, specimens prepared by the Salt-and-Pepper Blend method have higher transmittance values. Compounding increases the CR (lower clarity) and lower % PETG decreases the CR (higher clarity).

It appears from the data listed in Table II that PETG/SAN molded specimens prepared utilizing the Salt-and-Pepper Blend method can obtain nearly equivalent mechanical properties to specimens prepared by the compounding method and better contrast ratios.

EXAMPLES 16 TO 21

These examples, which are included here for comparison purposes, illustrate compositions which do not exhibit the balance of processability, toughness and clarity obtained with the compositions of the present invention. The molded specimens were prepared by the Salt-and-Pepper Blend method. The compositions and their properties are set forth in Table III.

TABLE III

| | SUMMARY OF EXAMPLES 16 TO 21 | | | | | | | | | |
|---|---|---|---|---|---|---|---|---|---|---|
| Example | % PET[1] | % PBT[2] | % PETG | % SAN | % SANMMA[3] | % PAMS[4] | % LURAN S[5] | MMP, MPa | IDI, JOULES | TRANS-MITTANCE, % |
| 16 | 75 | 0 | 0 | 25 | 0 | 0 | 0 | 2.4 | 0.2 | 57.91 |
| 17 | 0 | 75 | 0 | 25 | 0 | 0 | 0 | 4.4 | 3.8 | 5.47 |
| 18 | 0 | 0 | 75 | 0 | 25 | 0 | 0 | 6.4 | 79.0 | 12.30 |
| 19 | 0 | 0 | 75 | 10 | 0 | 15 | 0 | 4.8 | 1.0 | 21.70 |
| 20 | 0 | 0 | 75 | 15 | 0 | 10 | 0 | 5.1 | 71.6 | 32.30 |

TABLE III-continued
SUMMARY OF EXAMPLES 16 TO 21

| Example | % PET[1] | % PBT[2] | % PETG | % SAN | % SANMMA[3] | % PAMS[4] | % LURAN S[5] | MMP, MPa | IDI, JOULES | TRANS-MITTANCE, % |
|---------|----------|----------|--------|-------|-------------|-----------|--------------|----------|-------------|-------------------|
| 21      | 0        | 0        | 75     | 0     | 0           | 0         | 25           | 4.4      | 71.6        | 11.40             |

[1]PET = polyethylene terephthalate purchased from Goodyear under the product name "Cleartuf 6307".
[2]PBT = polybutylene terephthalate purchased from Celanese Corp. under the product name "Gafite 1602Z".
[3]SANMMA = styrene/acrylonitrile/methyl methacrylate copolymer containing 40/20/40% by weight of S/AN/MMA.
[4]PAMS = polyalpha-methylstyrene from Scientific Polymer Products Inc. (catalog #399), M.W. = 26,500.
[5]LURAN S = 20% polybutylacrylate rubber
80% 70/30 alpha-methylstyrene/acrylonitrile copolymer.

Examples 16 and 17 illustrate that the substitution of polyethylene terephthalate or polybutylene terephthalate for the PETG used in the present invention results in a significant decrease in transmittance and IDI. Example 18 shows a decrease in transmittance when SANMMA is used in place of SAN. Examples 19 and 20 also show a decrease in transmittance when the SAN is partially replaced by PAMS. Example 19 further demonstrates that when the SAN portion is replaced to the degree shown, the IDI drops dramatically. Example 21 shows a decrease in transmittance when the SAN portion is replaced by Luran S.

Having thus described the invention, what is claimed is:

1. A thermoplastic molding composition comprising:
   (a) from 95 to 65% by weight based on the total weight of (a) and (b) of a copolyester of a dicarboxylic acid moiety, at least 50 mole percent of which is terephthalic acid and a dihydric alcohol moiety, at least 50 mole percent of which is ethylene glycol, and from 20 to 50 mole percent of which is diethylene glycol or 1,4-cyclohexanedimethanol, the copolyester having a glass transition temperature (Tg) in the range of 40° to 85° C. and an inherent viscosity (I.V.) in the range of 0.2 to 10; and
   (b) from 5 to 35% by weight based on the total weight of (a) and (b) of a copolymer prepared utilizing 65 to 90% by weight based on the weight of the copolymer of a styrenic monomer and 35 to 10% by weight based on the weight of the copolymer of an ethylenically unsaturated nitrile;
   wherein the % Transmittance of the molding composition is 80.00 minimum.

2. The molding composition of claim 1 wherein the IDI is 17.0 Joules minimum and the MMP is 8.0 MPa maximum.

3. The molding composition of claim 1 wherein the styrenic monomer is styrene.

4. The molding composition of claim 1 wherein the ethylenically unsaturated nitrile is acrylonitrile.

5. Molded articles prepared from a thermoplastic molding composition comprising:
   (a) from 95 to 65% by weight based on the total weight of (a) and (b) of a copolyester of a dicarboxylic acid moiety, at least 50 mole percent of which is terephthalic acid and a dihydric alcohol moiety, at least 50 mole percent of which is ethylene glycol and 20 to 50 mole percent of which is diethylene glycol or 1,4-cyclohexanedimethanol, the copolyester having a glass transition temperature (Tg) in the range of 40° to 85° C. and an inherent viscosity (I.V.) in the range of 0.2 to 10; and
   (b) from 5 to 35% by weight based on the total weight of (a) and (b) of a copolymer prepared utilizing 65 to 90% by weight based on the weight of the copolymer of a styrenic monomer and 35 to 10% by weight based on the weight of the copolymer of an ethylenically unsaturated nitrile;
   wherein the % Transmittance of the molded articles is 80.00 minimum.

6. The molded articles of claim 5 wherein the IDI is 17.0 Joules minimum and the MMP is 8.0 MPa maximum.

7. A thermoplastic molding composition comprising:
   (a) from 90 to 70% by weight based on the total amount of (a) and (b) of a copolyester of a dicarboxylic acid moiety, at least 50 mole percent of which is terephthalic acid, and a dihydric alcohol moiety, at least 50 mole percent of which is ethylene glycol and 20 to 50 mole percent of which is diethylene glycol or 1,4-cyclohexanedimethanol, the copolyester having a glass transition temperature (Tg) in the range of 40° to 85° C. and an inherent viscosity (I.V.) in the range of 0.2 to 10; and
   (b) from 10 to 30% by weight based on the total weight of (a) and (b) of a copolymer prepared utilizing 65 to 90% by weight based on the weight of the copolymer of a styrenic monomer and 35 to 10% by weight based on the weight of the copolymer of an ethylenically unsaturated nitrile;
   wherein the % Transmittance of the molding composition is 80.00 minimum.

8. The molding composition of claim 7 wherein the IDI is 55.0 Joules minimum and the MMP is 6.7 MPa maximum.

9. The molding composition of claim 7 wherein the styrenic monomer is styrene.

10. The molding composition of claim 7 wherein the ethylenically unsaturated nitrile is acrylonitrile.

11. Molded articles prepared from a thermoplastic molding composition comprising:
    (a) from 90 to 70% by weight based on the total weight of (a) and (b) of a copolyester of a dicarboxylic acid moiety, at least 50 mole percent of which is terephthalic acid, and a dihydric alcohol moiety, at least 50 mole percent of which is ethylene glycol and 20 to 50 mole percent of which is diethylene glycol or 1,4-cyclohexanedimethanol, the copolyester having a glass transition temperature (Tg) in the range of 40° to 85° C. and an inherent viscosity (I.V.) in the range of 0.2 to 10; and
    (b) from 10 to 30% by weight based on the total weight of (a) and (b) of a copolymer prepared utilizing 65 to 90% by weight based on the weight of the copolymer of a styrenic monomer and 35 to 10% by weight based on the weight of the copolymer of an ethylenically unsaturated nitrile;
    wherein the % Transmittance of the molded articles is 80.00 minimum.

12. The molded articles of claim 11 wherein the IDI is 55.0 Joules minimum and the MMP is 6.7 MPa maximum.

* * * * *